United States Patent
Chanda et al.

(10) Patent No.: US 10,938,681 B2
(45) Date of Patent: Mar. 2, 2021

(54) CONTEXT-AWARE NETWORK INTROSPECTION IN SOFTWARE-DEFINED NETWORKING (SDN) ENVIRONMENTS

(71) Applicant: VMware, Inc., Palo Alto, CA (US)

(72) Inventors: Arijit Chanda, San Jose, CA (US); Nafisa Mandliwala, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 112 days.

(21) Appl. No.: 16/045,108

(22) Filed: Jul. 25, 2018

(65) Prior Publication Data
US 2020/0036608 A1 Jan. 30, 2020

(51) Int. Cl.
*H04L 12/26* (2006.01)
*H04L 29/06* (2006.01)

(52) U.S. Cl.
CPC ............ *H04L 43/028* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 10,193,811 B1 * | 1/2019 | Satyanarayana | ....... | G06N 20/00 |
| 2014/0016501 A1 * | 1/2014 | Kamath | .................. | H04L 45/64 370/253 |
| 2016/0134531 A1 * | 5/2016 | Assarpour | ............. | H04L 49/309 370/392 |
| 2016/0359658 A1 * | 12/2016 | Yadav | ..................... | H04L 41/16 |
| 2017/0279773 A1 * | 9/2017 | Koripella | ............ | H04L 63/1408 |
| 2018/0183759 A1 | 6/2018 | Gunda et al. | | |
| 2018/0212818 A1 * | 7/2018 | Ide | ........................ | H04L 43/026 |
| 2018/0219773 A1 * | 8/2018 | Li | ........................ | G06F 9/45558 |
| 2018/0307833 A1 * | 10/2018 | Noeth | ................. | H04L 63/1441 |
| 2018/0321879 A1 * | 11/2018 | Lu | .......................... | G06F 3/0604 |

* cited by examiner

*Primary Examiner* — Lonnie V Sweet
(74) *Attorney, Agent, or Firm* — Su IP Consulting

(57) ABSTRACT

Example methods are provided for a first host to perform context-aware network mapping a software-defined networking (SDN) environment. One example method may comprise: detecting multiple packet flows that include an egress packet flow originating from a first endpoint and destined for a second host, and an ingress packet flow originating from a second host or a third host and destined for the first endpoint or a second endpoint. The method may also comprise: in response to detecting the egress packet flow, obtaining first packet flow information and first context information; in response to detecting the ingress packet flow, obtaining second packet header information and second context information; and generating network map information that identifies the egress packet flow based on the first packet flow information and first context information, and the ingress packet flow based on the second packet flow information and second context information.

21 Claims, 7 Drawing Sheets

Network map information table at Host-A 510

| Src IP | Src Port | Dst IP | Dst Port | Protocol | User Info | App Info | |
|--------|----------|--------|----------|----------|-----------------|---------|-----|
| IP-1 | 54123 | IP-4 | 22 | SSH | (U1, G1, X, D1) | putty | 511 |
| IP-1 | 43212 | IP-5 | 21 | FTP | (U1, G1, X, D1) | firezilla | 512 |
| IP-3 | 80 | IP-2 | 80 | HTTP | (U2, G2, Y, D2) | browser | 513 |

Network map information table at Host-B 520

| Src IP | Src Port | Dst IP | Dst Port | Protocol | User Info | App Info | |
|--------|----------|--------|----------|----------|-----------------|---------|-----|
| IP-1 | 54123 | IP-4 | 22 | SSH | (U1, G1, X, D1) | putty | 521 |
| IP-3 | 80 | IP-2 | 80 | HTTP | (U2, G2, Y, D2) | browser | 522 |

Network map information table at Host-C 530

| Src IP | Src Port | Dst IP | Dst Port | Protocol | User Info | App Info | |
|--------|----------|--------|----------|----------|-----------------|---------|-----|
| IP-1 | 43212 | IP-5 | 21 | FTP | (U1, G1, X, D1) | firezilla | 531 |

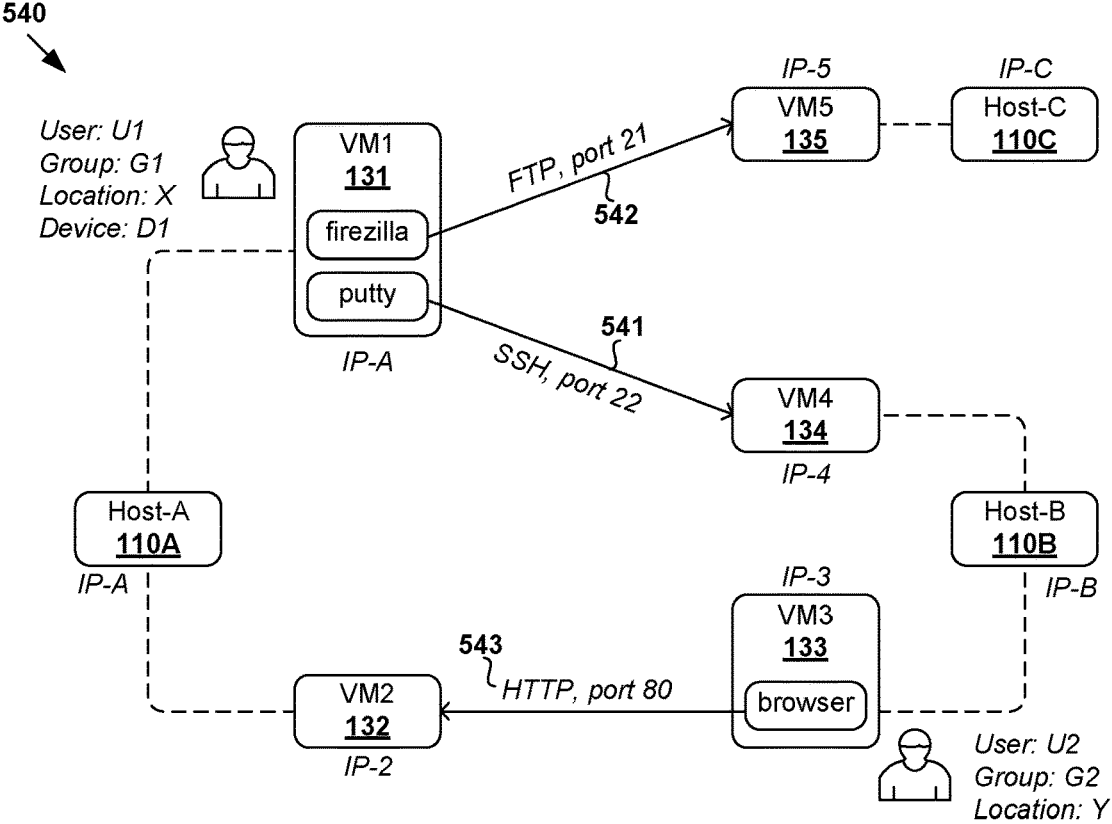

Fig. 5

Aggregated network map information 610

| Src IP | Src Port | Dst IP | Dst Port | Protocol | User Info | App Info | |
|---|---|---|---|---|---|---|---|
| IP-1 | 54123 | IP-4 | 22 | SSH | (U1, G1, X, D1) | putty | 511/521* |
| IP-1 | 43212 | IP-5 | 21 | FTP | (U1, G1, X, D1) | firezilla | 512/531* |
| IP-3 | 80 | IP-2 | 80 | HTTP | (U2, G2, Y, D2) | browser | 513/522* |
| IP-6 | 34521 | IP-4 | 22 | SSH | (U3, G3, Z, D3) | putty2 | 611** |

\* From Fig. 5
\*\* Based on network map information generated by Host-B and/or Host-C

```
admin: $ nmap -top--ports 10 10.32.43.219

Starting Nmap 7.60 (https://nmap.org) at 2018-XX-XX
Nmap scan report for IP-A
Host is up (0.35s latency)

PORT      STATE    SERVICE   DEST IP   USER            APP

22/tcp    open     ssh       IP-4      (U1,G1,X,D1)    putty

21/tcp    open     ftp       IP-5      (U1,G1,X,D1)    firezilla

80/tcp    open     http      IP-2      (U2,G2,Y,D2)    browser
```

710                          720
    *Nmap results*        *Nmap results supplemented using*
                         *network map information*

```
Nmap done: 1 IP address (1 host up) scanned in 2.85
seconds
```

Fig. 7

CONTEXT-AWARE NETWORK INTROSPECTION IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, network introspection is a useful tool for users (e.g., system or network administrators, etc.) for various network management purposes, such as network troubleshooting, forensics and security, etc. However, conventional network introspection tools may be inadequate for SDN environments. This is undesirable because, inter alia, more time may be required for root-causing and solving network problems.

BRIEF DESCRIPTION OF DRAWINGS

FIG. 5 is a schematic diagram illustrating example network map information generated by multiple hosts according to the example in FIG. 3;

FIG. 7 is a schematic diagram illustrating an example enhancement to a network mapping tool using the example in FIG. 3.

DETAILED DESCRIPTION

Figure 1:
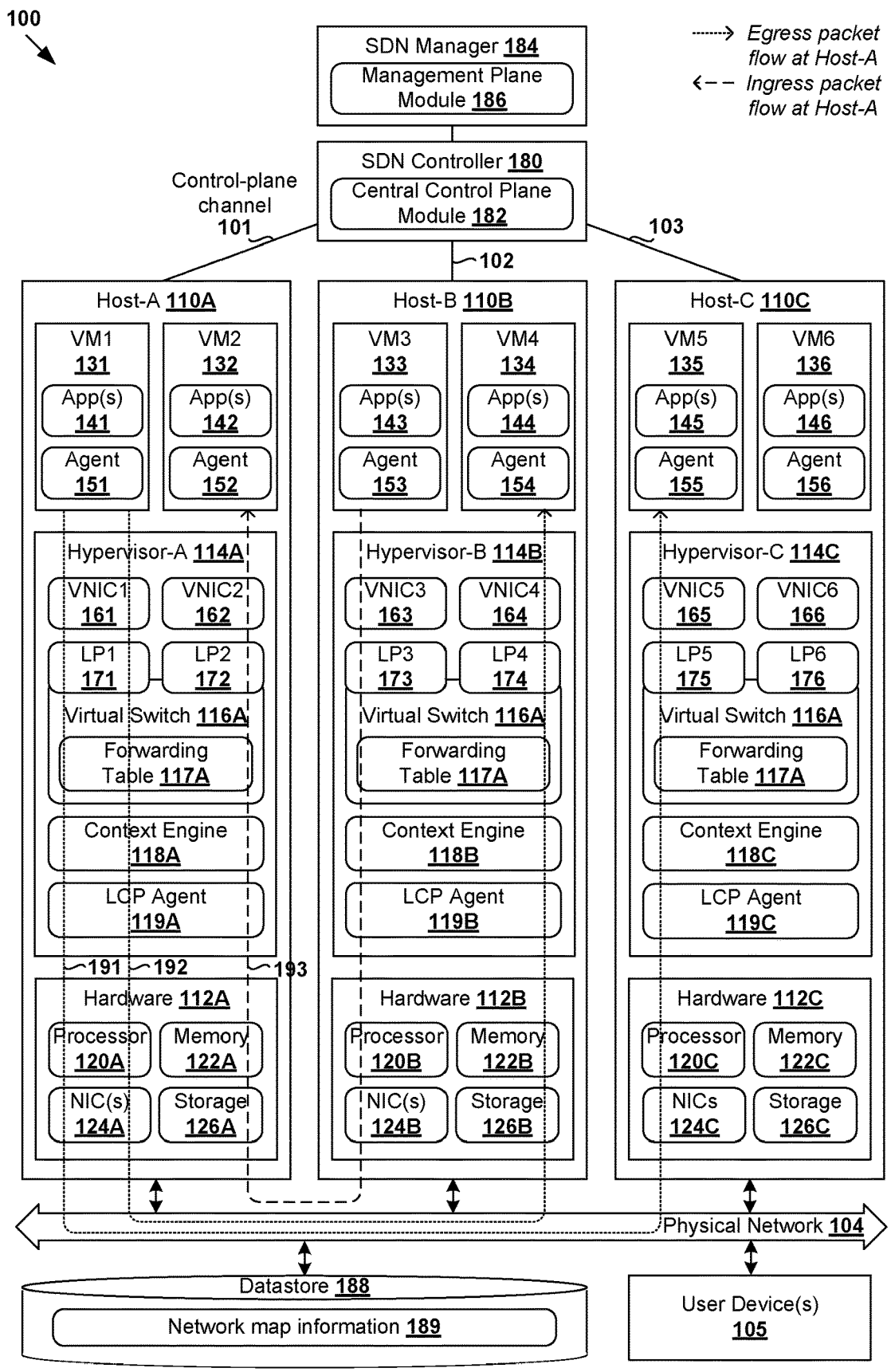
FIG. 1 is a schematic diagram illustrating an example Software-Defined Networking (SDN) environment in which context-aware network introspection may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to network introspection will now be explained in more detail using FIG. 1, which is a schematic diagram illustrating example Software-Defined Networking (SDN) environment 100 in which context-aware network introspection may be performed. It should be understood that, depending on the desired implementation, SDN environment 100 may include additional and/or alternative components than that shown in FIG. 1.

In the example in FIG. 1, SDN environment 100 includes multiple hosts, such as host-A 110A, host-B 110B and host-C 110C that are inter-connected via physical network 104. Each host 110A/110B/110C includes suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 and VM6 136. In practice, SDN environment 100 may include any number of hosts (also known as a "host computers", "host devices", "physical servers", "server systems", "transport nodes," etc.), where each host may be supporting tens or hundreds of VMs. Hypervisors 114A-C may each implement any suitable virtualization technology, such as VMware ESX® or ESXi™ (available from VMware, Inc.), Kernel-based Virtual Machine (KVM), etc.

Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc. Virtual resources are allocated to respective VMs 131-136 to support a guest operating system (OS; not shown for simplicity) and application(s) 141-146. Corresponding to hardware 112A/112B/112C, the virtual resources may include virtual CPU, guest physical memory, virtual disk, virtual network interface controller (VNIC), etc. Hardware resources may be emulated using virtual machine monitors (VMMs). For example in FIG. 1, VNICs 161-166 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 114A/114B/114C further implements virtual switch 116A/116B/116C and a logical distributed router (DR) instance (not shown for simplicity) to handle egress packets from, and ingress packets to, corresponding VMs 131-136. In SDN environment 100, logical switches and logical distributed routers may be implemented in a distributed manner and can span multiple hosts to connect VMs 131-136. For example, logical switches that provide logical layer-2 connectivity may be implemented collectively by virtual switches 116A-C and represented internally using forwarding tables 117A-C at respective virtual switches 116A-C. Forwarding tables 117A-C may each include entries that collectively implement the respective logical switches. Further, logical distributed routers that provide logical layer-3 connectivity may be implemented collectively by DR instances and represented internally using routing tables (not shown for simplicity) at respective DR instances. Routing tables may each include entries that collectively implement the respective logical distributed routers.

Virtual switch 116A/116B/116C also maintains any suitable forwarding information to forward packets to and from corresponding VMs 131-136. Packets are received from, or sent to, each VM via an associated logical port. For example, logical ports 171-176 are associated with respective VMs 131-136. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

As used herein, the term "logical port" may refer generally to a port on a logical switch to which a virtualized computing instance is connected. A "logical switch" may refer generally to an SDN construct that is collectively implemented by virtual switches 116A-C in the example in FIG. 1, whereas a "virtual switch" may refer generally to a software switch or software implementation of a physical switch. In practice, there is usually a one-to-one mapping between a logical port on a logical switch and a virtual port on virtual switch 116A/116B/116C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through SDN, benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. SDN controller 180 and SDN manager 184 are example network management entities that facilitate implementation of logical networks in SDN environment 100. One example of an SDN controller is the NSX controller component of VMware NSX® (available from VMware, Inc.) that may be a member of a controller cluster (not shown) and configurable using SDN manager 184. One example of an SDN manager is the NSX manager component that provides an interface for end users to perform any suitable configuration in SDN environment 100.

SDN controller 180 and SDN manager 184 support central control plane (CCP) module 182 and management plane module 186, respectively. To send and receive the control information (e.g., configuration information), each host 110A/110B/110C may implement local control plane (LCP) agent 119A/119B/119C to interact with SDN controller 180. For example, control-plane channel 101/102/103 may be established between SDN controller 180 and host 110A/110B/110C using TCP over Secure Sockets Layer (SSL), etc. Management entity 180/184 may be implemented using physical machine(s), virtual machine(s), a combination thereof, etc. Users operating respective user devices 105 may access the functionalities of VMs 131-136, SDN manager 184 and/or SDN controller 180 via any suitable user interface, such as graphical user interface (GUI), command-line interface (CLI), application programming interface (API) calls, etc.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 on host-A 110A, VM4 134 on host-B 110B and VM5 135 on host-C 110C may be located on the same logical layer-2 segment, such as VXLAN segment with VXLAN network identifier (VNI)=6000.

Each host 110A/110B/110C also maintains data-plane connectivity with other host(s) via physical network 104 to facilitate communication among VMs located on the same logical overlay network. Hypervisor 114A/114B/114C may implement a virtual tunnel endpoint (VTEP) to encapsulate and decapsulate packets with an outer header (also known as a tunnel header) identifying the relevant logical overlay network (e.g., VNI=6000). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B) and hypervisor-C 114C implements a third VTEP with (IP-C, MAC-C, VTEP-C). Encapsulated packets may be sent via an end-to-end, bi-directional communication path (known as a tunnel) between a pair of VTEPs over physical network 104.

In practice, network introspection may be performed to, inter alia, detect undesirable events in SDN environment 100, as well as to identify the source(s) or origin(s) of a network problem for network troubleshooting, forensics and security purposes. In general, network introspection tools map and help discover network infrastructure in SDN environment 100. Network analysis generally depends on the quality and relevance of information that the network introspection tool provides. However, conventional network introspection tools may be inadequate for SDN environment 100.

For example, consider a scenario where two users log onto a server remotely, and both users are associated with the same IP address. Conventional network introspection tools are generally incapable of differentiating between the two users. If one of the users runs a vulnerable application, conventional tools may flag the IP address, but not the specific user. If a firewall rule is configured to block the IP address, the other (innocent) user sharing the same IP address will be adversely affected. Further, in SDN environment 100, different VMs 131-136 may support various respective applications 141-146. Conventional network introspection tools may also lack the capability to help system administrators understand packet flows among VMs 131-136 and respective applications 141-146. Due to such example inadequacies, system administrators will need to rely on their knowledge of the network architecture, and more time may be required for solving network problems.

Context-Aware Network Introspection

According to examples of the present disclosure, network introspection may be improved in SDN environment 100 using a "context-aware" approach. In particular, hosts 110A-C may perform context-aware network introspection to obtain packet flow information and context information associated with multiple packet flows in SDN environment 100. This way, examples of the present disclosure may provide high-level information relating to packet flows, as well as more specific context information relating to applications and/or users in SDN environment 100. This in turn provides system administrators with a more effective diagnostic tool to detect, root-cause and solve network problems, thereby improving system performance and reducing the impact of network outages.

Throughout the present disclosure, various examples will be explained using host-A 110A as an example "first host," host-B 110B as example "second host," host-C 110C as example "third host," VM1 131 as example "first endpoint," VM2 132 as example "second endpoint," and SDN controller 180 and SDN manager 184 as example "management entities." As used herein, the term "endpoint" may refer generally to an originating or terminating node of a bi-directional inter-process communication flow of packet(s). An endpoint may be any suitable virtualized computing instance or other type of workload.

Figure 2:
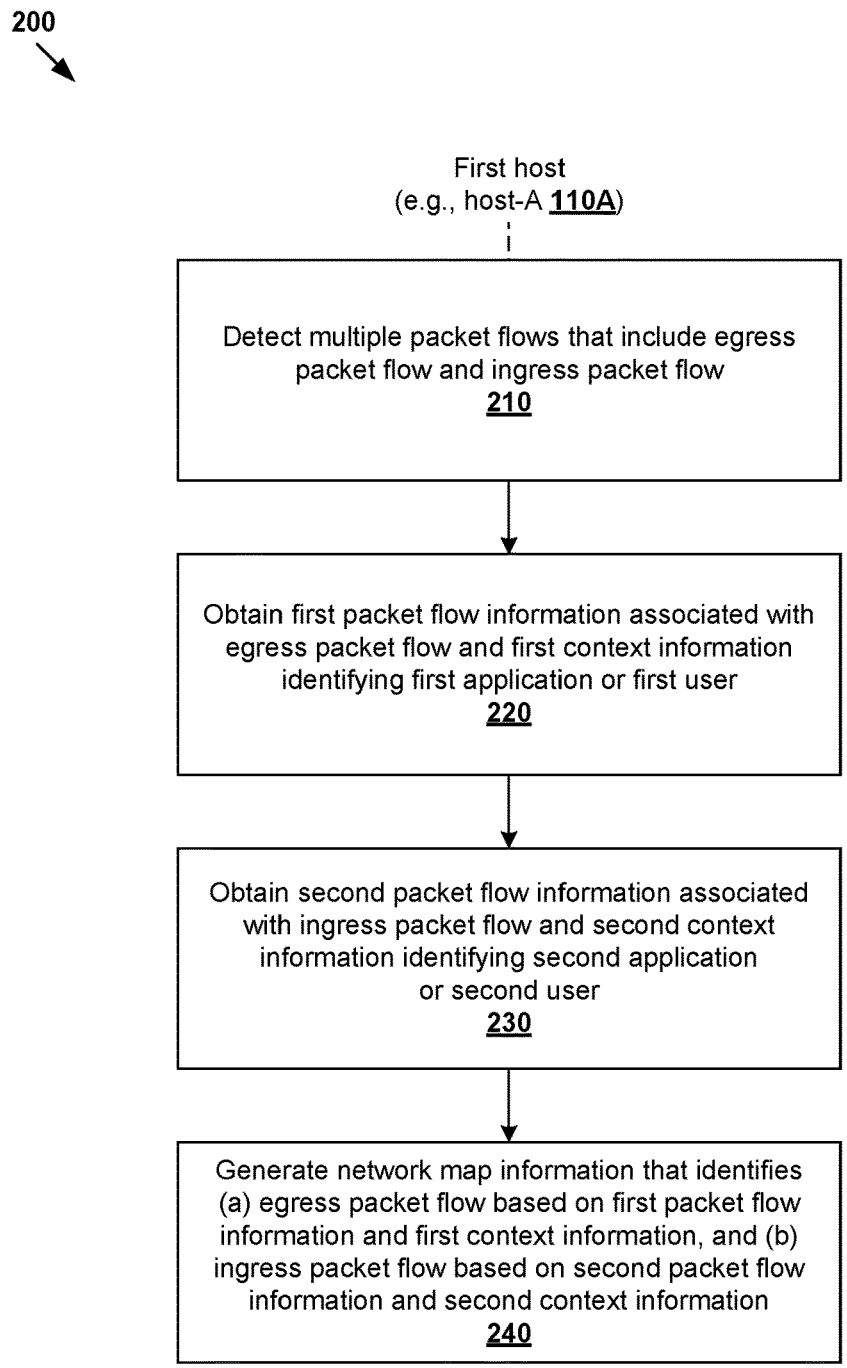
FIG. 2 is a flowchart of an example process for a host to perform context-aware network introspection in an SDN environment.

In more detail, FIG. 2 is a flowchart of example process 200 for a host to perform context-aware network introspection in SDN environment 100. Example process 200 may include one or more operations, functions, or actions illustrated by one or more blocks, such as 210 to 240. The various blocks may be combined into fewer blocks, divided into additional blocks, and/or eliminated depending on the desired implementation. In practice, example process 200 may be implemented by any suitable host 110A/110B/110C, such as using context engine 118A/118B/118C, etc.

At 210 in FIG. 2, host-A 110A detects multiple packet flows originating from, or destined for, host-A 110A. For example in FIG. 1, host-A 110A detects egress packet flow (see 191) originating from VM1 131 and destined for VM4 134 supported by host-B 110B, and egress packet flow (see 192) originating from VM1 131 and destined for VM5 135 supported by host-C 110C. Host-A 110A also detects ingress packet flow (see 193) originating from host-B 110B (or more particularly, VM3 133) and destined for VM2 132. Although not shown for simplicity, host-A 110A may also detect egress packet flow(s) destined for, and/or ingress packet flow(s) originating from, host-C 110C.

At 220 in FIG. 2, in response to detecting egress packet flow 191/192, host-A 110A obtains first packet flow information identifying egress packet flow 191/192 and first context information identifying a first application or a first user associated with VM1 131. At 230 in FIG. 2, in response to detecting ingress packet flow 193 from host-B 110B, host-A 110A obtains second packet flow information identifying ingress packet flow 193 and second context information identifying a second application or a second user associated with source host-B 110B. The term "obtaining" may refer generally to one entity retrieving, receiving or extracting information from a source, such as context engine 118A at host-A 110A extracting information from egress or ingress packets, retrieving or receiving information from VMs 131-132 or any other source, etc.

As used herein, the term "packet flow information" may refer generally to information (e.g., packet header information) describing a flow of packets from a source to a destination, such as layer-2 information (e.g., source and destination MAC addresses), layer-3 information (source and destination IP addresses), layer-4 information (e.g., source and destination port numbers, protocols or services), any combination thereof, etc. The term "context information" may refer generally to any suitable application information associated an application (e.g., source or destination application) and/or user information associated with a user (e.g., user controlling source or destination application), etc. Various examples of application information and user information will be discussed using FIG. 3 and FIG. 4.

At 240 in FIG. 2, host-A 110A generates network map information that identifies egress packet flow 191/192 based on the first packet flow information and first context information, and ingress packet flow 193 based on the second packet flow information and second context information. Unlike conventional approaches, the network map information with a more granular and better understanding of users communicating in SDN environment 100, what applications they are running, etc. In at least some examples, the network map information (also known as a "neighborhood map") may be used to describe connections or relationships between endpoints (e.g., VMs 131-136), hosts 110A-C, applications 141-146 and users in SDN environment 100.

As will be described using FIG. 3 to FIG. 5, any suitable "packet flow information" and "context information" may be obtained at blocks 220 and 230. Further, host-A 110A may aggregate its network map information with other network map information generated by hosts 110B-C. In the example in FIG. 1, aggregated network map information (see 189) may be stored in a datastore (see 188) accessible by hosts 110A-C via physical network 104. This facilitates information sharing and verification among hosts 110A-C to further enhance the operational aspects of SDN environment 100, such as monitoring, troubleshooting, auditing, intrusion detection, etc. Based on the network map information generated at block 240, a network map may be generated to provide a visualization of the egress packet flow using the first packet flow information and first context information, and the ingress packet flow using the second packet flow information and second context information.

Detailed Examples

Figure 3:
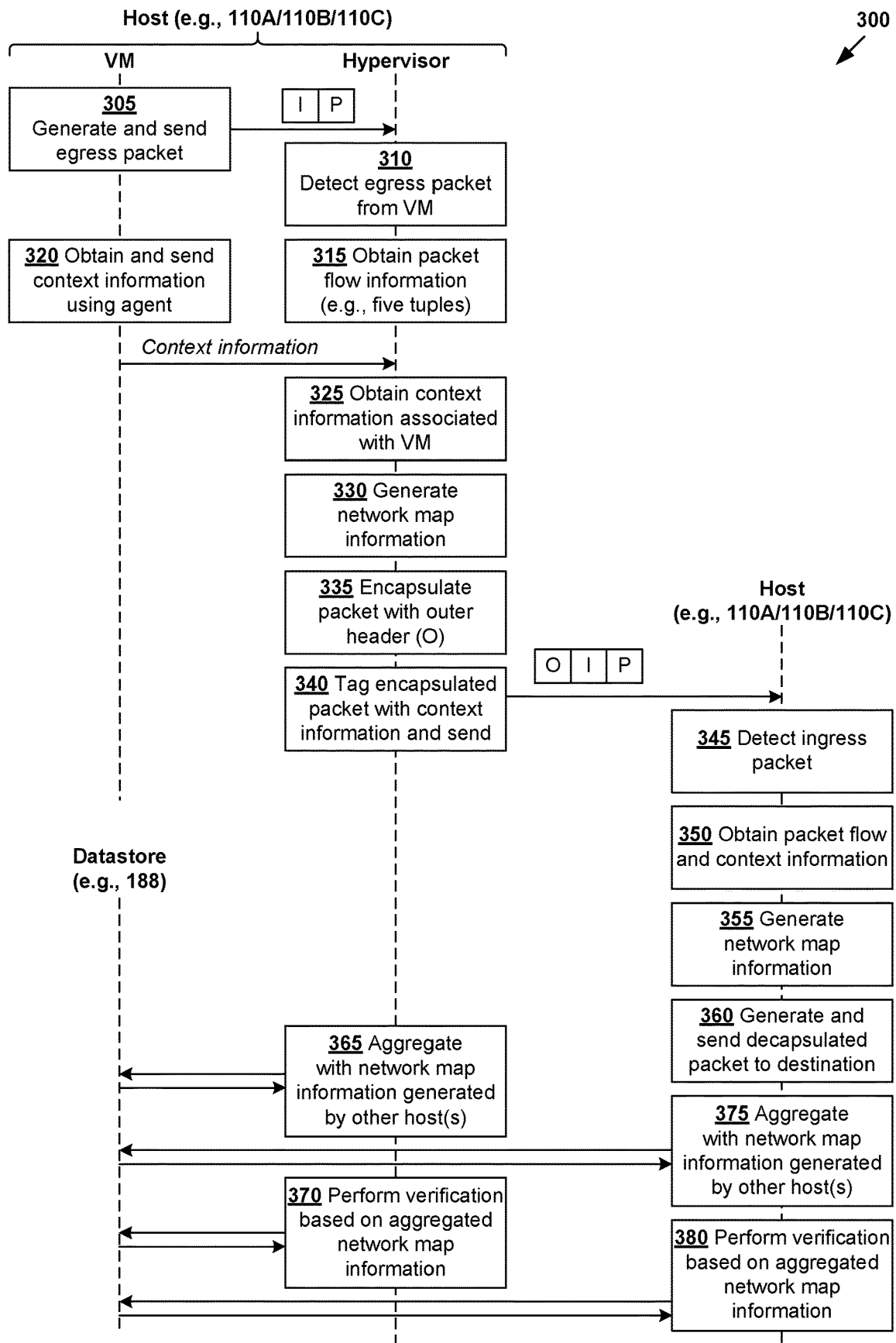
FIG. 3 is a flowchart of an example detailed process for context-aware network introspection in an SDN environment.

FIG. 3 is a flowchart of example detailed process 300 for context-aware network introspection in SDN environment 100. Example process 300 may include one or more operations, functions, or actions illustrated by one or more blocks, such as 305 to 380. The various blocks may be combined into fewer blocks, divided into additional blocks, and/or eliminated depending on the desired implementation. The example in FIG. 3 will be explained using FIG. 4 and FIG. 5. In particular, FIG. 4 is a schematic diagram illustrating example 400 of hosts 110A-C performing context-aware network introspection in SDN environment 100 according to the example in FIG. 3. FIG. 5 is a schematic diagram illustrating example network map information generated by multiple hosts 110A-C according to the example in FIG. 3.

In the following, consider three example scenarios: (a) VM1 131 at host-A 110A initiating a Secure Shell (SSH) session with VM4 134 at host-B 110B; (b) VM1 131 initiating a File Transfer Protocol (FTP) session with VM5 135 at host-C 110C; and (c) VM3 133 at host-B 110B initiating a HyperText Transfer Protocol (HTTP) session with VM2 132 at host-A 110A. In these examples, hosts 110A-C may each act as a "first host" to perform context-aware network introspection according to examples of the present disclosure. Other hosts may act as a "second host" or "third host" with which the "first host" communicates.

(a) Egress Packet Flow from VM1 131 to VM4 134

In a first example, at 305 and 310 in FIG. 3, host-A 110A (e.g., using context engine 118A) detects an egress packet flow originating from VM1 131. In the example in FIG. 4, egress packet (see 410) from VM1 131 includes inner header 412 (labelled "I") and payload 414 (labelled "P"). Inner header 412 includes source address information (IP address=IP-1, MAC address=MAC-1) and source port number=54123 associated with VM1 131, and destination address information (IP-4, MAC-4) and destination port number=22 associated with VM4 134.

At 315 in FIG. 3, in response to detecting egress packet 410 originating from VM1 131, context engine 118A obtains packet flow information associated with egress packet 410. As described using FIG. 1 and FIG. 2, any suitable packet flow information may be extracted from egress packet 410 at block 3, such as layer-2 information (e.g., source and destination MAC addresses), layer-3 information (source and destination IP addresses), layer-4 information (e.g., source and destination port numbers, protocols or services, TCP/UDP parameters), any combination thereof, etc. In one example, host-A 110A may extract five-tuple information (source IP=IP-1, source port=54123 destination IP=IP-4, destination port=22, protocol=SSH) from egress packet 410. Depending on the desired implementation, any alternative and/or additional packet flow information may be obtained. In practice, a protocol may be identified based on its assigned port number, such as 22 for SSH, 21 for FTP, 80 for HTTP, 53 for Domain Name Service (DNS), etc.

At 325 in FIG. 3, context engine 118A obtains context information associated with egress packet 410. Any suitable approach may be used, such as by obtaining the context information from agent 151 implemented by VM1 131, etc. For example, agent 151 (also known as a "thin agent" or "guest agent") may be configured to capture network control events (e.g., pre-connect, connect, disconnect, etc.) from VM1 131. Agent 151 then reports the events to context engine 118A via a Multiplexer (MUX) component (e.g., UNIX process) and any suitable communication channel between VM1 131 and hypervisor 114A, such as a Virtual Machine Communication Interface (VMCI) channel, etc.

Depending on the desired implementation, agent 151 may register hooks (e.g., callbacks) with kernel-space or user-space module(s) implemented in a guest OS (not shown for simplicity) of VM1 131 for new network connection events, process events, etc. In response to detecting a new SSH session initiated by VM1 131, agent 151 receives a callback from the guest OS and sends context information to context engine 118A. In practice, agent 151 may be a guest OS driver that uses Windows Filtering Platform (WFP) to interact with packet processing taking place at multiple layers in a networking stack of the guest OS, and Windows File System Filter Driver (FSFD) to intercept file or network events. Any suitable approach may be used to obtain context information, examples of which are described in related U.S. patent application Ser. No. 15/836,888 entitled "Context based firewall services for data message flows for multiple concurrent users on one machine," the content of which is incorporated herein in its entirety.

Any suitable "context information" may be obtained, such as application information identifying an application, user information identifying a user, any combination thereof, etc. Example application information may include application identifier (ID), application name, process hash, application path with command line parameters, resource consumption information (e.g., CPU consumption, network consumption, memory consumption, etc.) associated with application, application version, security level associated with application, etc. Example user information may include user name, user ID, location information associated with user, user device information associated with user (e.g., International Mobile Equipment Identity (IMEI) number, device model or brand, device type, technical specification, etc.), directory group ID associated with user, etc.

Figure 4:
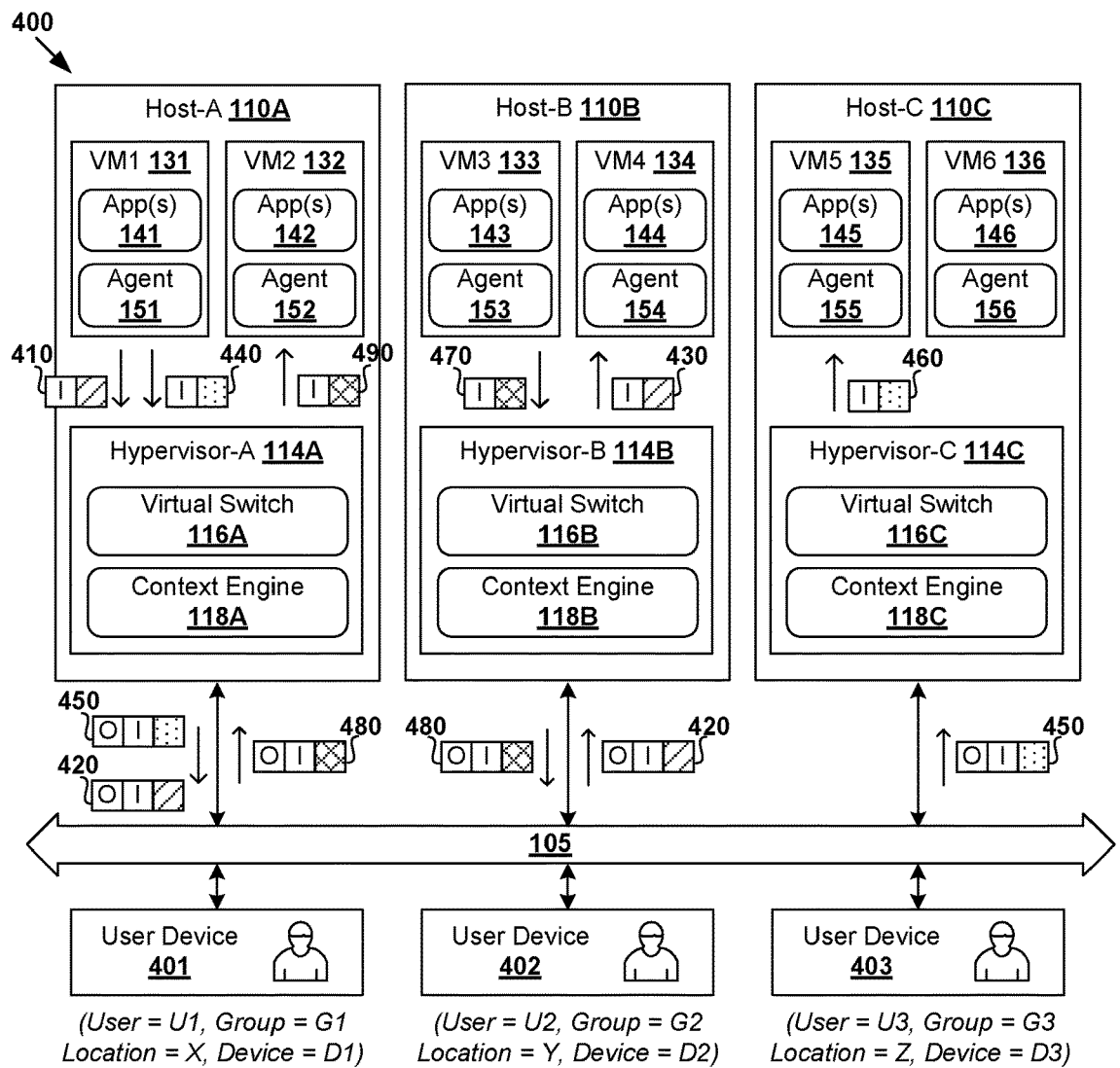
FIG. 4 is a schematic diagram illustrating an example of hosts performing context-aware network introspection in an SDN environment according to the example in FIG. 3.

In the example in FIG. 4, agent 151 may send any suitable context information to context engine 118A, such as application information=putty associated with an application supported by VM1 131 and from which egress packet 410 originates, user information=(user=U1, group=G1, location=X, device=D1) associated with a user operating the application via user device 401. In practice, group=G1 may represent an Active Directory (a trademark of Microsoft Corporation) group to which user=U1 is assigned. For example, groups may be created to assign a common permission sets to multiple users at once, instead of performing the assignment to each user individually. A "group" may refer generally to a collection of members that can be managed as a single unit, such as managers, employees, doctors, nurses, administrators, etc. Using nesting, a group may be a member of another group. Any additional and/or alternative identity management solution besides Active Directory may be used.

At 330 in FIG. 3, host-A 110A updates its (local) network map information based on the packet flow information and context information obtained at respective blocks 315 and 325. Referring also to FIG. 5, based on egress packet 410 from VM1 131 to VM4 134, context engine 118A may generate network map information in the form of (source IP=IP-1, source port=54123, destination IP=IP-4, destination port=22, protocol=SSH, user=(U1, G1, X, D1), application=putty). See first entry 511 in network map information table 510 maintained by host-A 110A in FIG. 5.

At 335 and 340 in FIG. 3, host-A 110A generates encapsulated packet 420 that includes the context information obtained at block 325. In the example in FIG. 4, encapsulated packet 420 is generated by encapsulating egress packet 410 with outer header 422 (labelled "O") specifying source VTEP information (IP-A, MAC-A) associated with a source VTEP implemented by hypervisor-A 114A at host-A 110A, and destination VTEP information (IP-B, MAC-B) associated with a destination VTEP implemented by hypervisor-B 114B at host-B 110B. Although not shown for simplicity, outer header 422 may specify information relating to a logical overlay network (e.g., VNI=6000) to which VM1 131 and/or VM4 134 are located.

Encapsulated packet 420 also includes tag 424 specifying context information to cause destination host-B 110B to perform context-aware network introspection. In practice, a datapath along which encapsulated packet 420 is forwarded may support a mechanism (e.g., API) that allows any kernel-space or user-space module(s) to add the context information as part of outer header 422, such as a GENEVE header with option fields, etc. In this case, host-A 110A may implement a kernel-space module (e.g., header insertion processor) that is registered for receiving I/O callbacks to get a notification relating to egress or ingress packets.

In response to receiving a callback relating to egress packet 410, the kernel-space module may retrieve application information=putty and user information=(user=U1, group=G1, location=X, device=D1) associated with (source IP=IP-1, source port=54123 destination IP=IP-4, destination port=22, protocol=SSH) from table 510 in FIG. 5. Egress packet 410 is then processed by an encapsulation/decapsulation module that adds the context information to outer header 422. This way, as will be further described below, destination host-B 110B may perform context-aware network introspection based on the context information in encapsulated packet 420.

At 345 and 350 in FIG. 3, in response to detecting encapsulated packet 420 (i.e., an ingress packet) from source host-A 110A, destination host-B 110B obtains or extracts packet flow information (source IP=IP-1, source port=54123, destination IP=IP-4, destination port=22, protocol=SSH) and context information (application=putty, user=U1, group=G1, location=X, device=D1) from encapsulated packet 420.

At 355 in FIG. 3, host-B 110B (e.g., using context engine 118A) updates its (local) network map information to associate the packet flow information with the context information. See first entry 521 in network map information table 520 maintained by host-B 110B in FIG. 5. At 360 in FIG. 3, host-B 110B performs decapsulation to remove outer header 422 before forwarding decapsulated packet 430 (i.e., same as 410) to destination VM4 134.

(b) Egress Packet Flow from VM1 131 to VM5 135

In a second example, host-A 110A and host-C 110C may perform the above to learn network map information associated with packet communication between VM1 131 and VM5 135. Similarly, in response to detecting second egress packet 440 addressed from VM1 131 to VM5 135, host-A 110A may obtain packet flow information (source IP=IP-1, source port=43212, destination IP=IP-5, destination port=21, protocol=FTP). Host-A 110A may also obtain context information (application=firezilla, user=U1, group=G1, location=X, device=D1) associated with an application supported by VM1 131, and a user operating the application via user device 401. Second egress packet 440, which includes inner header 442 and payload 444, is then encapsulated with outer header 452 to generate encapsulated packet 450.

Outer header 452 is configured to include source VTEP information (IP-A, MAC-A), and destination VTEP information (IP-C, MAC-C) associated with a destination VTEP at hypervisor-C 114C. Outer header 452 further includes context information 454 (application=firezilla, user=U1, group=G1, location=X, device=D1) to cause context-aware network introspection at destination host-B 110B. See 305 to 340 in FIG. 3. In response to detecting encapsulated packet 450 (i.e., an ingress packet), host-C 110C obtains or extracts packet flow information and context information from encapsulated packet 450, and update its network map information accordingly. Host-C 110C also performs decapsulation to remove outer header 452, and forwards decapsulated packet 460 to destination VM5 135 according to blocks 345-370 in FIG. 3.

As shown in FIG. 5, based on the egress packet flow from VM1 131 and VM5 135, host-A 110A and host-C 110C both generate network map information 512/531 in the form of (source IP=IP-1, source port=43212, destination IP=IP-5, destination port=21, protocol=FTP, application=firezilla, user=U1, group=G1, location=X, device=D1). See second entry 512 in network map information table 510 maintained by host-A 110A, and first entry 531 in network map information table 530 maintained by host-C 110C in FIG. 5.

(c) Ingress Packet Flow from VM3 133 to VM2 132

In a third example, host-B 110B and host-A 110A and host-B 110B may perform the above to learn network map information associated with packet communication between VM3 133 and VM2 132. Similarly, in response to detecting third egress packet 470 addressed from VM3 133 to VM2 132, host-B 110B may obtain packet flow information (source IP=IP-3, source port=80, destination IP=IP-2, destination port=80, protocol=HTTP). Host-B 110B may also obtain context information (application=browser, user=U2, group=G2, location=Y, device=D2) associated with an application supported by VM3 133, and a user operating the application via user device 402.

Third egress packet 470, which includes inner header 472 and payload 474, is then encapsulated with outer header 482 to generate encapsulated packet 480. Outer header 482 is configured to include source VTEP information (IP-B, MAC-B), and destination VTEP information (IP-A, MAC-A) associated with a destination VTEP at hypervisor-A 114C. Outer header 482 further includes context information 484 7 to facilitate context-aware network introspection at destination host-A 110A. See 305 to 340 in FIG. 3.

At the destination, in response to detecting encapsulated packet 480 (i.e., an ingress packet), host-A 110A obtains or extracts packet flow information and context information from encapsulated packet 480, and update its network map information 510 accordingly. Further, host-A 110A performs decapsulation to remove outer header 482, and forwards decapsulated packet 490 to destination VM2 132. See 345 to 370 in FIG. 3. As shown in FIG. 5, based on the packet communication between VM3 133 and VM2 132, host-B 110B and host-A 110A generate network map information 513/522 in the form of (source IP=IP-3, source port=80, destination IP=IP-2, destination port=80, protocol=HTTP, application=browser, user=U2, group=G2, location=Y, device=D2). See third entry 513 in network map information table 510 of host-A 110A, and second entry 522 in network map information table 520 of host-B 110B in FIG. 5.

Aggregated Network Map Information

Referring to FIG. 5, example neighborhood map or network map 540 may be generated based on network map information 510 learned by host-A 110A. Network map 540 represents a visual representation of various relationships among hosts 110A-C, VMs 131-135, applications supported by VMs 131-135 and users operating the applications in SDN environment 100. In particular, network map 540 identifies a first packet flow or relationship (see 541) from VM1 131 at host-A 110A to VM4 134 at host-B 110B, particularly an SSH session initiated by application=putty supported by VM1 131 and operated by user=U1 associated with (group=G1, location=X, device=D1).

Network map 540 also describes a second packet flow or relationship (see 542) from VM1 131 at host-A 110A to VM5 135 at host-C 110C, particularly an SSH session initiated by application=firezilla supported by VM1 131 and operated by user=U1 associated with (group=G1, location=X, device=D1). Further, network map 540 also describes a third packet flow or relationship (see 543) from VM3 133 at host-B 110B to VM2 132 at host-A 110A, particularly an FTP session initiated by application=browser supported by VM3 133 and operated by user=U2 associated with (group=G2, location=Y, device=D2).

According to 365 in FIG. 3, host-A 110A may aggregate network map information 511-513 in table 510 with other network map information 521-531 generated by host-B 110B and host-C 110C. This facilitates information sharing as well as verification among hosts 110A-C. For example, according to 370 in FIG. 3, host-A 110A may verify network map information 511 associated with egress packet 410 in table 510 based on corresponding network map information 521 in table 520 of host-B 110B. Similarly, host-B 110B and host-C 110C may perform aggregation and verification according to blocks 375-380. For example, verification may be performed to identify any potential security threats or malicious attacks in SDN environment 100.

Figure 6:
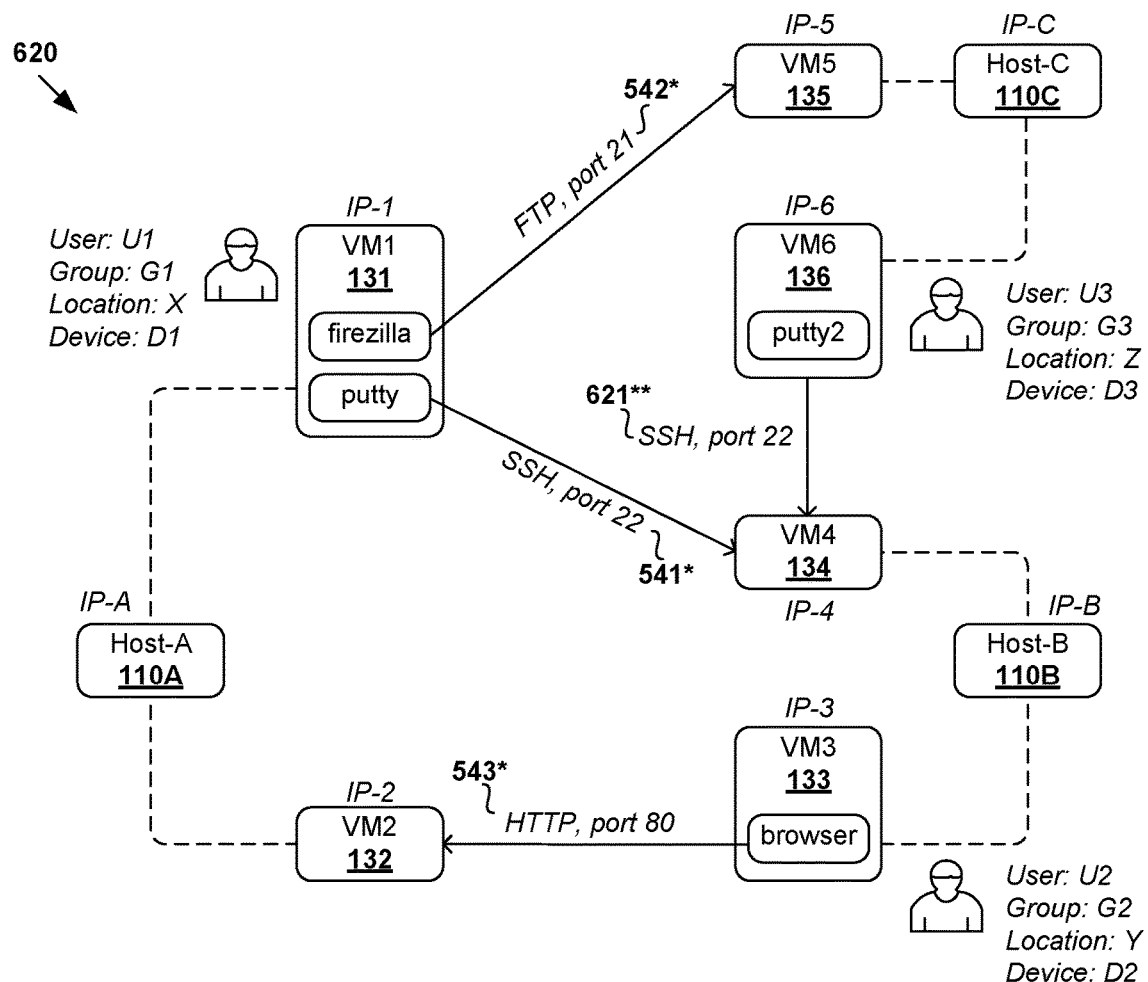
FIG. 6 is a schematic diagram illustrating example aggregated network map information generated by multiple hosts according to the example in FIG. 3.

FIG. 6 is a schematic diagram illustrating aggregated network map information 610 generated by multiple hosts 110A-C according to the example in FIG. 3. Aggregated network map information 610 represents an aggregation of network map information in tables 510-530 maintained by respective hosts 110A-C. Corresponding network map 620 provides a visualization of packet flows using packet flow information and context information. For example, network map 620 may provide high-level information such as the direction of packet flows in SDN environment 100, as well as more granular information such as which user or IP address downloads a potentially vulnerable file or is using a rogue port. By mapping and visualizing aggregated network map information 610, network map 620 provides all packet flow information and context information (e.g., on a single pane) to help system administrators gain a better understanding of the hosts 110A-C, VMs 131-136, packet flows, applications and users in SDN environment 100.

According to examples of the present disclosure, aggregated network map information 610 may be updated dynamically by hosts 110A-C as packet flows are initiated or terminated. In the example in FIG. 6, host-B 110B and host-C 110C may detect a packet flow from VM6 136 to VM4 134. In this case, according to the example in FIG. 3, host-B 110B and host-C 110C may learn packet flow information (source IP=IP-6, source port=80, destination IP=IP-4, destination port=22, protocol=SSH), and context information that identifies application=putty2 supported by VM6 136 as well as user=U3 operating the application using user device 403 in FIG. 4. The user is also associated with (group=G3, location=Z, device=D3). The packet flow is represented using a new relationship (see 621) from VM6 136 to VM4 134 in network map 620.

In practice, aggregated network map information 610 and/or network map 620 may be used to help shape context-aware network policies to enhance security in SDN environment 100. For example, based on context information in the form of application information and/or user information, the context-aware network policies may be application-based, user-based, location-based, device-based policies, any combination thereof, etc. Example user-based firewall rules may be in the form of (source group=G1, destination=IP-4, port=any, protocol=any, action=allow) to allow access by one group of users and (source=G3, destination=IP-4, port=any, protocol=any, action=deny) to deny access by another group of users.

Example application-based firewall rules may be in the form of (source application=putty, destination=IP-4, port=any, protocol=any, action=allow) and (source application=browser, destination=IP-2, port=any, protocol=any, action=allow). Other examples include location-based firewall rule (source location=X, destination=IP-4, port=any, protocol=any, action=allow) and device-based firewall rule (source device=D2, destination=IP-4, port=any, protocol=any, action=allow). The context-aware network policies may be configured manually by system administrators and/or programmatically using any suitable approach (e.g., automatically using scripts).

Enhancement to Network Mapping Tool(s)

Examples of the present disclosure may be used together with, and/or to enhance, existing network monitoring tools such as Network Mapper (Nmap), etc. In practice, Nmap (a registered trademark of "The Nmap Project") is a network mapping tool that has a number of mechanisms for mapping out networks, such as port scanning mechanisms, OS detection, version detection, ping sweeps, etc. Nmap uses raw IP packets to determine which hosts are available on the network, which services those hosts are offering, which OS they are running, which type of packet filters or firewalls are in use, etc.

In one example, packet flow information may be obtained at block 315 in FIG. 3 by running a network mapping tool (e.g., Nmap) on VMs 131-136 to gather information about open ports, corresponding protocol and other VMs in SDN environment 100. Depending on the desired implementation, the information may be sent to context engine via any suitable communication channel, such as VMCI channel established between a VM and its corresponding context engine 118A/118B/118C. Information obtained using the network mapping tool running on a VM may be matched with corresponding packet flow information and context information obtained by context engine 118A/118B/118C via agent 151/152/153/154/155/156, etc.

In another example, results from a network mapping tool (e.g., Nmap) may be enhanced using network map information generated according to examples of the present disclosure. An example will be explained using FIG. 7, which is a schematic diagram illustrating example enhancement 700 to a network mapping tool using the example in FIG. 3. In addition to existing results relating to ports and services (see 710 in FIG. 7), examples of the present disclosure may be performed to supplement the results with context information (e.g., application and user information) as well as destination address (see 720 in FIG. 7). This information provides system administrators with a broader insight into SDN environment 100, allowing them to drill down much deeper into specific applications and/or users. For example, in a threat monitoring use case, system administrators may run the enhanced Nmap tool to find out if an endpoint is connecting to any vulnerable applications, etc.

Container Implementation

Although explained using VMs 131-136, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs. Network map information discussed using FIG. 1 to FIG. 6 may also include container information, such as container MAC or IP address information, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as host 110A/110B/110C and management entity 180/184 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host to perform context-aware network introspection in a software-defined networking (SDN) environment that includes the first host, a second host and a third host, wherein the first host supports a first endpoint and a second endpoint, and the method comprises:

detecting multiple packet flows that include an egress packet flow originating from the first endpoint and destined for the second host, and an ingress packet flow originating from the second host or the third host and destined for the first endpoint or the second endpoint;

in response to detecting the egress packet flow, obtaining first packet flow information identifying the egress packet flow, and first context information identifying a first application or a first user associated with the first endpoint;

in response to detecting the ingress packet flow, obtaining second packet flow information identifying the ingress packet flow, and second context information identifying a second application or a second user associated with the second host or the third host;

generating network map information that identifies the egress packet flow based on the first packet flow information and first context information, and the ingress packet flow based on the second packet flow information and second context information; and after generating the network map information, generating an encapsulated packet by encapsulating an egress packet from the egress packet flow with an outer header that includes the first context information.

2. The method of claim 1, wherein the method further comprises:

aggregating the network map information, being first network map information, with at least one of the following: second network map information generated by the second host based on packet flows detected by the second host and third network map information generated by the third host based on packet flows detected by the third host.

3. The method of claim 2, wherein the method further comprises:

performing verification of the first network map information based on at least one of the following: the second network map information generated by the second host and the third network map information generated by the third host.

4. The method of claim 1, wherein the method further comprises:

based on the network map information, generating a network map that provides a visualization of the egress packet flow using the first packet flow information and first context information, and the ingress packet flow using the second packet flow information and second context information.

5. The method of claim 1, wherein the method further comprises:

sending the encapsulated packet to the second host to cause the second host to perform context-aware network mapping based on the first context information.

6. The method of claim 1, wherein obtaining the first context information comprises:

obtaining, from an agent implemented by the first endpoint, the first context information that includes at least one of the following: application information associated with the first application and user information associated with the first user operating the first application.

7. The method of claim 1, wherein obtaining the second context information comprises:
obtaining the second context information from an outer header of an ingress packet from the ingress packet flow, wherein the second context information includes at least one of the following: application information associated with the second application and user information associated with the second user operating the second application.

8. A non-transitory computer-readable storage medium that includes a set of instructions which, in response to execution by a processor of a first host, cause the processor to perform a method of context-aware network introspection in a software-defined networking (SDN) environment that includes the first host, a second host and a third host, wherein the first host supports a first endpoint and a second endpoint, and the method comprises:
detecting multiple packet flows that include an egress packet flow originating from the first endpoint and destined for the second host, and an ingress packet flow originating from the second host or the third host and destined for the first endpoint or the second endpoint;
in response to detecting the egress packet flow, obtaining first packet flow information identifying the egress packet flow, and first context information identifying a first application or a first user associated with the first endpoint;
in response to detecting the ingress packet flow, obtaining second packet flow information identifying the ingress packet flow, and second context information identifying a second application or a second user associated with the second host or the third host;
generating network map information that identifies the egress packet flow based on the first packet flow information and first context information, and the ingress packet flow based on the second packet flow information and second context information; and
after generating the network map information, generating an encapsulated packet by encapsulating an egress packet from the egress packet flow with an outer header that includes the first context information.

9. The non-transitory computer-readable storage medium of claim 8, wherein the method further comprises:
aggregating the network map information, being first network map information, with at least one of the following: second network map information generated by the second host based on packet flows detected by the second host and third network map information generated by the third host based on packet flows detected by the third host.

10. The non-transitory computer-readable storage medium of claim 9, wherein the method further comprises:
performing verification of the first network map information based on at least one of the following: the second network map information generated by the second host and the third network map information generated by the third host.

11. The non-transitory computer-readable storage medium of claim 8, wherein the method further comprises:
based on the network map information, generating a network map that provides a visualization of the egress packet flow using the first packet flow information and first context information, and the ingress packet flow using the second packet flow information and second context information.

12. The non-transitory computer-readable storage medium of claim 8, wherein the method further comprises:
sending the encapsulated packet to the second host to cause the second host to perform context-aware network mapping based on the first context information.

13. The non-transitory computer-readable storage medium of claim 8, wherein obtaining the first context information comprises:
obtaining, from an agent implemented by the first endpoint, the first context information that includes at least one of the following: application information associated with the first application and user information associated with the first user operating the first application.

14. The non-transitory computer-readable storage medium of claim 8, wherein obtaining the second context information comprises:
obtaining the second context information from an outer header of an ingress packet from the ingress packet flow, wherein the second context information includes at least one of the following: application information associated with the second application and user information associated with the second user operating the second application.

15. A first host configured to perform context-aware network introspection in a software-defined networking (SDN) environment that includes the first host, a second host and a third host, wherein the first host comprises:
a processor; and
a non-transitory computer-readable medium having stored thereon instructions that cause the processor to support a first endpoint and a second endpoint and to perform the following:
detect multiple packet flows that include an egress packet flow originating from the first endpoint and destined for the second host, and an ingress packet flow originating from the second host or the third host and destined for the first endpoint or the second endpoint;
in response to detecting the egress packet flow, obtain first packet flow information identifying the egress packet flow, and first context information identifying a first application or a first user associated with the first endpoint;
in response to detecting the ingress packet flow, obtain second packet flow information identifying the ingress packet flow, and second context information identifying a second application or a second user associated with the second host or the third host;
generate network map information that identifies the egress packet flow based on the first packet flow information and first context information, and the ingress packet flow based on the second packet flow information and second context information; and
after generating the network map information, generate an encapsulated packet by encapsulating an egress packet from the egress packet flow with an outer header that includes the first context information.

16. The first host of claim 15, wherein the instructions further cause the processor to:
aggregate the network map information, being first network map information, with at least one of the following: second network map information generated by the second host based on packet flows detected by the second host and third network map information generated by the third host based on packet flows detected by the third host.

17. The first host of claim 16, wherein the instructions further cause the processor to:
perform verification of the first network map information based on at least one of the following: the second network map information generated by the second host and the third network map information generated by the third host.

18. The first host of claim 15, wherein the instructions further cause the processor to:
based on the network map information, generate a network map that provides a visualization of the egress packet flow using the first packet flow information and first context information, and the ingress packet flow using the second packet flow information and second context information.

19. The first host of claim 15 wherein the instructions further cause the processor to:
send the encapsulated packet to the second host to cause the second host to perform context-aware network mapping based on the first context information.

20. The first host of claim 15, wherein the instructions for obtaining the first context information cause the processor to:
obtain, from an agent implemented by the first endpoint, the first context information that includes at least one of the following: application information associated with the first application and user information associated with the first user operating the first application.

21. The first host of claim 15, wherein the instructions for obtaining the second context information cause the processor to:
obtain the second context information from an outer header of an ingress packet from the ingress packet flow, wherein the second context information includes at least one of the following: application information associated with the second application and user information associated with the second user operating the second application.

* * * * *